US009502057B1

(12) United States Patent
Schreiber et al.

(10) Patent No.: US 9,502,057 B1
(45) Date of Patent: Nov. 22, 2016

(54) DISK DRIVE SUSPENSION HAVING OFFSET SWAGE HUB HOLE

(71) Applicant: Magnecomp Corporation, Murrieta, CA (US)

(72) Inventors: Christopher Schreiber, Nonthabury (TH); Peter Hahn, Wildomar, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 15/171,515

(22) Filed: Jun. 2, 2016

Related U.S. Application Data

(60) Provisional application No. 62/186,940, filed on Jun. 30, 2015.

(51) Int. Cl.
*G11B 5/48* (2006.01)

(52) U.S. Cl.
CPC .......... *G11B 5/4813* (2013.01); *G11B 5/4833* (2013.01)

(58) Field of Classification Search
CPC . G11B 5/4813; G11B 5/4826; G11B 5/4833; G11B 5/48; G11B 5/4806; G11B 5/50; G11B 5/5521; F16B 19/10; Y10T 403/49
See application file for complete search history.

(56) References Cited

U.S. PATENT DOCUMENTS

| | | | | |
|---|---|---|---|---|
| 6,368,685 | B1 | 4/2002 | Schmidt et al. | |
| 6,372,314 | B1 | 4/2002 | Schmidt et al. | |
| 6,417,994 | B1 | 7/2002 | Yim et al. | |
| 6,754,044 | B1 * | 6/2004 | Braunheim | G11B 5/4826 360/244.5 |
| 6,941,641 | B2 * | 9/2005 | Van Sloun | G11B 5/4813 29/603.03 |
| 7,130,156 | B1 * | 10/2006 | Fossum | G11B 5/4813 360/244.6 |
| 7,304,824 | B2 | 12/2007 | Brink et al. | |
| 7,324,307 | B2 | 1/2008 | Brink et al. | |
| 7,889,459 | B2 * | 2/2011 | Lee | G11B 5/4826 360/244.2 |
| 8,049,995 | B1 | 11/2011 | Ee et al. | |
| 8,804,286 | B1 * | 8/2014 | Aparimarn | G11B 5/4833 360/244.6 |
| 9,013,833 | B2 * | 4/2015 | Aparimarn | G11B 5/4813 360/244.5 |
| 9,123,364 | B1 * | 9/2015 | Apairmarn | G11B 5/39 |
| 2006/0044693 | A1 * | 3/2006 | Shimozato | G11B 5/4813 360/244.6 |

* cited by examiner

*Primary Examiner* — Brian Miller
(74) *Attorney, Agent, or Firm* — Intellectual Property Law Offices of Joel Voelzke, APC

(57) ABSTRACT

A base plate for a suspension has a swage hub whose inner diameter is offset from the outer diameter, and more specifically, the inner diameter of the swage hub is offset so as to be farther away from the head slider than is the outer diameter. The offset reduces variability in post-swaging deflection of the suspension at the distal end of the base plate to which the load beam is mounted.

17 Claims, 4 Drawing Sheets

120 54 42 32 34 122 56 52 L 46 44 58

CBD 120 44 44 46 46 ID $T_1$ $T_2$ OD

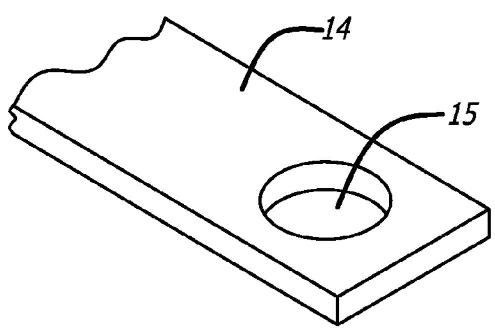
FIG. 1
(Prior Art)
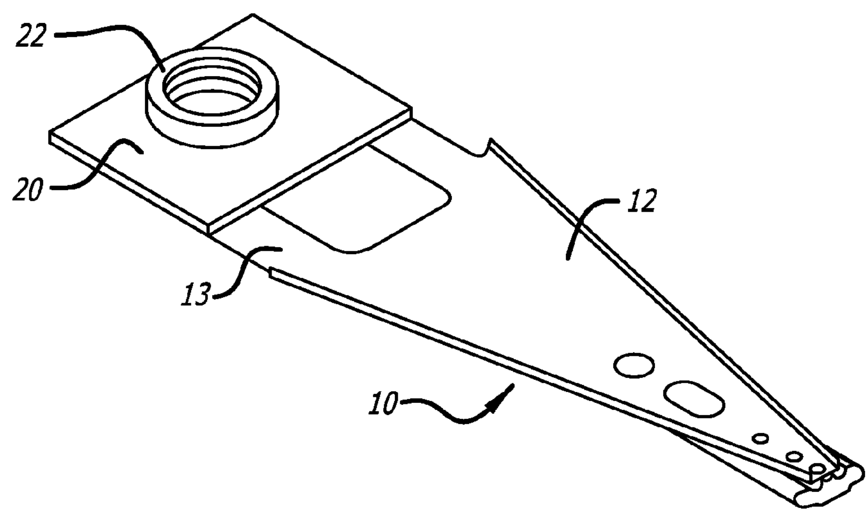

DISK DRIVE SUSPENSION HAVING OFFSET SWAGE HUB HOLE

CROSS-REFERENCE TO RELATED APPLICATIONS

This application claims priority from U.S. Provisional Patent Application No. 62/186,940 filed Jun. 30, 2015, the disclosure of which is incorporated by reference as if set forth herein in its entirety.

BACKGROUND OF THE INVENTION

1. Field of the Invention

This invention relates to the field of suspensions for disk drives. More particularly, this invention relates to the field of a disk drive suspension having an offset swage hub hole.

2. Description of Related Art

In disk drives such as magnetic medium hard disk drives, a read/write data transducer head is typically carried on head slider, which is mounted a suspension at a distal end of the suspension for writing data to, and reading data from, a recording medium such as a spinning magnetic disk platter. The suspension is typically affixed to an actuator arm by swaging, the actuator arm being carried on an E-block which carries a number of actuator arms each having their own associated suspensions affixed thereto. The E-block is moved by a voice coil motor in order to position the read/write head over the proper place on the spinning magnetic disk platter. Each suspension typically has a base plate, the base plate having a swage hub by which the suspension is swaged to the actuator arm. This arrangement and the swaging process is discussed more fully in U.S. Pat. No. 8,049,995 to Ee et al. and U.S. Pat. No. 6,215,624 to Summers, both of which are assigned to the present applicant. FIG. 1 shows a representative prior art suspension 10 having a load beam 12, a spring or spring region 13, and a base or base plate 20 having a swage boss tower or swage hub 22. The swage hub 22 is inserted through swage hole 15 in actuator arm 14, and a swage ball (not shown) is then passed through swage hub 22 in order to securely swage suspension 10 to actuator arm 14.

The angle of the suspension arm relative to the actuator arm, or the pitch static attitude (PSA) and the roll static attitude (RSA) after swaging and before adjustment are highly sensitive to small irregularities in the suspension and actuator arm and in the swaging process itself, and particularly in the swage hub dimensions. This sensitivity leads to undesirable variations in the final position of the transducer head at the end of the suspension arm relative to the recording medium platter.

U.S. Pat. No. 9,013,833 to Aparimarn suggests using a non-circular swage hole, such as an elliptical or oval shaped, swage hole or boss tower outside surface, or both, in order to increase compression between the swage boss tower and the actuator arm aperture in the roll direction more than in the pitch direction. However, such non-circular features are difficult to manufacture particularly within tight tolerances, and present additional difficulties for deswage/rework.

SUMMARY OF THE INVENTION

The inventors have discovered that variations in the deflection of the suspension arm after swaging can be reduced by offsetting the inside diameter (ID) of the hub flange relative to its outside diameter (OD), particularly with the offset being toward the rear or proximal end of the baseplate so that the swage hub wall is thinner on the proximal side away from the head slider. Offsetting the ID of the hub flange, i.e., the ID of the hub hole, usually by a few microns, helps to dictate the location of the variation and reduce variability. By making the thinner side of the swage hub wall to be the proximal end which is away from the end on which the head slider is mounted, a differential deformation direction is established by which the proximal side deforms more upon swaging than does the distal side. That is desirable because the deformation that occurs should be toward the proximal end and away from the distal end on which the load beam including the read/write head is mounted. According to simulations, when the swage hub ID is offset in the proximal direction from the swage hub OD, the post-swaging distortion is less at the proximal end of the base plate than at the distal end of the base plate. Accordingly, the post-swaging variation in PSA and RSA are reduced.

The offset of both the swage hub ID and the swage hub counter bore can be adjusted as needed to optimize the amount of deformation in the tail area, i.e., away from the suspension head. It is believed that offsetting the ID will also provide a higher retention torque, i.e., will affix the suspension base plate to the actuator arm more securely.

The inside and outside diameters of the swage boss do not necessarily need to be round for use with the invention, but can be kept round as in traditional swage bosses for ease of manufacturing and rework.

In this specification and in the appended claims, the terminology will be used that the swage hub ID is offset from the swage hub OD, it being understood that this terminology is shorthand for the more technical description that the geometric center of the swage hub's inner peripheral wall is offset from the geometric center of the swage hub's outer peripheral wall.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

BRIEF DESCRIPTION OF THE DRAWINGS

FIG. 1 is an oblique view of a prior art suspension and distal end of an actuator arm.

DETAILED DESCRIPTION OF THE PREFERRED EMBODIMENTS

Figure 2:
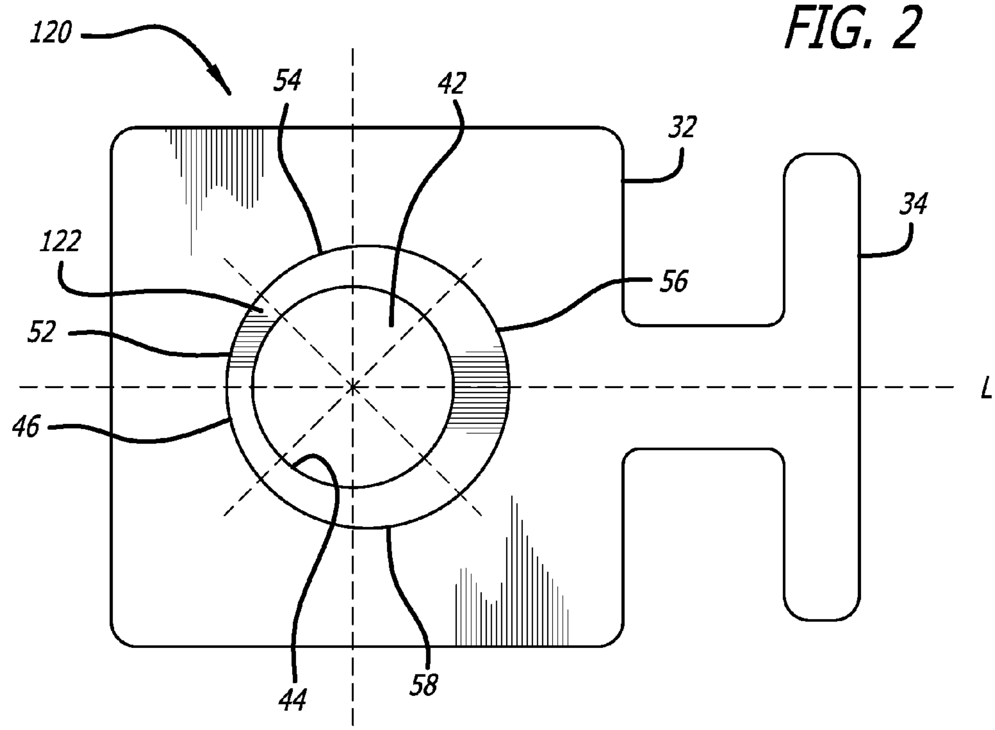
FIG. 2 is top plan view of a suspension base plate with a swage boss having an offset of the swage hole according to a first embodiment of the invention in which the inside diameter of the swage hole is offset in the suspension proximal direction, and showing the offset in exaggerated form for illustration purposes.

FIG. 2 is top plan view of an exemplary suspension base plate 120 having a swage boss 122, the swage boss 122 having an offset of the swage hub hole 42 according to a first embodiment of the invention. The ID of the swage hub hole 42 is offset in the suspension proximal direction along the longitudinal axis L of the base plate. The swage hub 122's inner peripheral wall 44 has a geometric center illustrated by the cross hairs. That geometric center is offset from the geometric center of the swage hub's outer peripheral wall 46. The swage hub hole ID is thus offset from the swage hub hole OD. The offset is shown in exaggerated form for illustration purposes.

The base plate 120 in the exemplary embodiment also has a base portion 32 and a spring mount portion 34 to which a spring portion of a load beam is typically laser welded. The distal end of the base plate 120 is thus on the right hand side in the figure; the proximal end of the base plate 120 is on the left hand side in the figure. A number of variations are possible with respect to the construction of the base plate, the load beam, and the suspension spring. The embodiment illustrated is merely one possibility.

Figure 3:
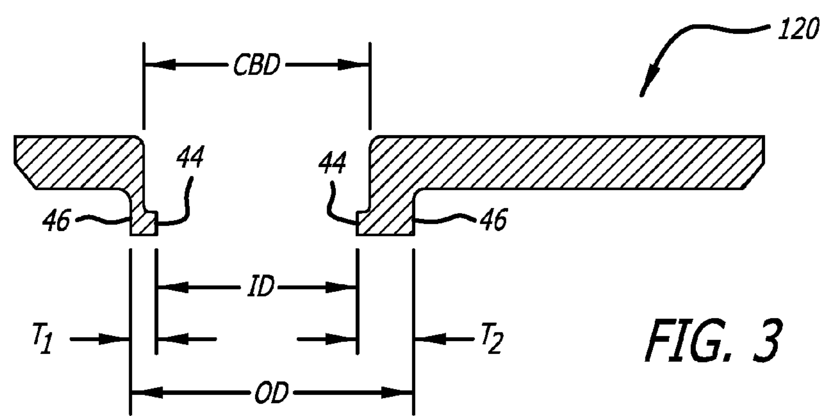
FIG. 3 is a side sectional view of the base plate of FIG. 2.

FIG. 3 is a side sectional view of the base plate 120 of FIG. 2. The distance between the swage hub's inner peripheral wall 44 and the outer peripheral wall 46 on the proximal side defines the thickness $T_1$ on the proximal side. Similarly, the distance between the swage hub's inner peripheral wall 44 and the outer peripheral wall 46 on the distal side defines the thickness $T_2$ on the distal side. Proximal side thickness $T_1$ is less than distal side thickness $T_2$. The ID is offset in the proximal direction from the OD. The hub counterbore diameter CBD can also be offset from the OD. In this example the CBD is offset in the proximal direction from the OD by generally the same amount as the ID.

In an exemplary embodiment, the swage hub has the following parameters:

ID=1.372 mm

OD=1.851 mm

Offset distance=0.05 mm.

The offset distance is therefore approximately 3.6% of the ID, and approximately 2.7% of the OD. More generally, the offset distance is within a range of 2% to 4% of the ID, and more generally still within a range of 1% to 6% of the ID; the offset is also within a range of 2%-4% of the OD, and more generally still within a range of 1% to 6% of the OD.

Because the ID is offset from the OD, the thickness of the swage hub is non-uniform. The thickness varies as a function of the circumferential position on the swage hub, with the thickness being a minimum at the proximal end of the swage hub, and a maximum at the distal end of the swage hub that is diametrically opposite the proximal end. Between those two points the thickness is between the minimum and the maximum. It follows necessarily that the thickness is at a minimum in the 90° quadrant that defines the proximal-most quadrant 52, and is a maximum in the 90° quadrant that defines the distal-most quadrant 56. It further follows that swage hub portions 54, 58 that lie between proximal-most 90° quadrant 52 and distal-most 90° quadrant 56 have thicknesses that are greater than the thickness of the proximal-most 90° quadrant 52 and less than the thickness of the distal-most 90° quadrant 56.

Figure 4:
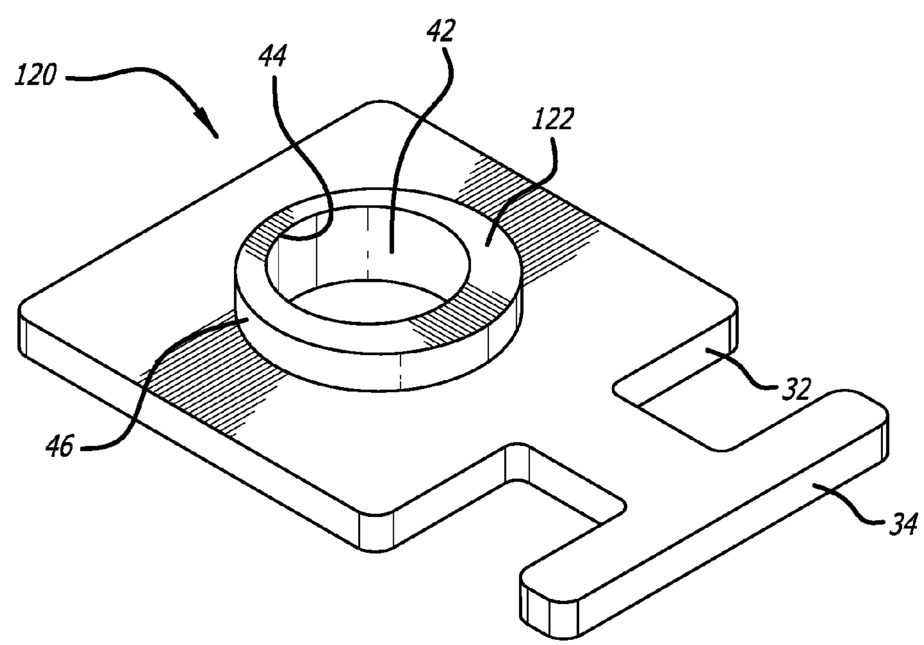
FIG. 4 is a perspective view of the suspension base plate of FIG. 2.

FIG. 4 is a perspective view of the suspension base plate of FIG. 2.

Post swaging, the asymmetric hub takes on an elliptical shape. The resultant elliptical shape is expected to create a greater retention torque, similar to the effect of putting in a woodruff key in a corresponding key slot. It is believed that post-swaging distortions in the suspension's PSA and RSA of the suspension will be minimized when the hub hole ID is offset in a direction away from the distal end of the suspension according to the first embodiment, i.e., when the hub hole is moved away from the slider and closer to the actuator arm, relative to the outside of the swage boss tower, as shown in FIGS. 2-4.

Figure 5:
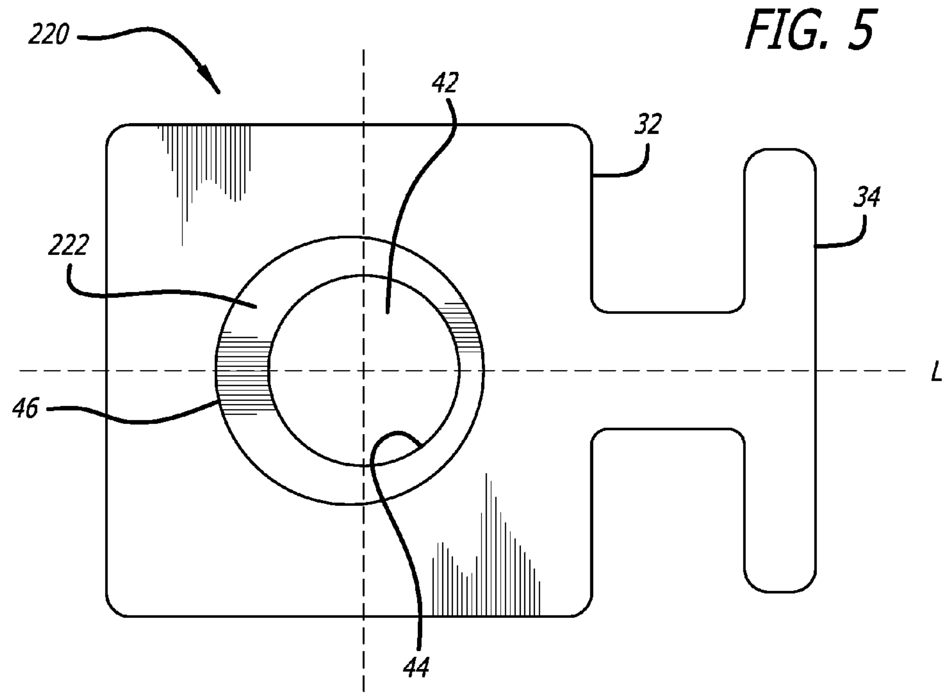
FIG. 5 is top plan view of a suspension base plate having an offset swage hole according to the second embodiment of the invention in which the inside diameter of the swage hole is offset in the suspension distal direction, and showing the offset in exaggerated form for illustration purposes.

FIG. 5 is top plan view of a suspension base plate 220 having an offset swage hole according to the second embodiment of the invention in which the ID of the swage hole is offset in the suspension distal direction, and showing the offset in exaggerated form for illustration purposes.

Figure 6:
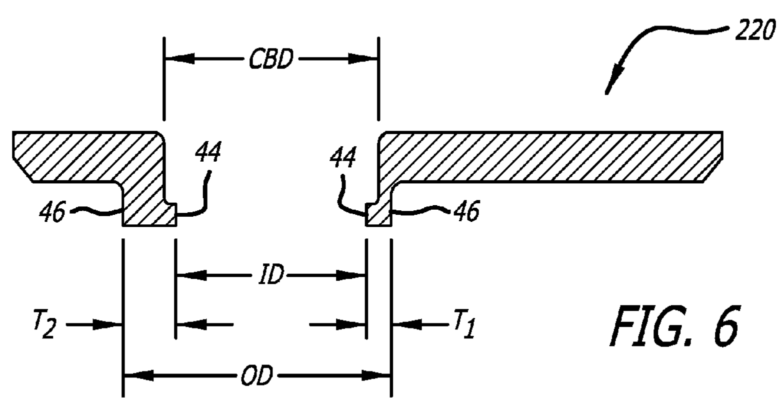
FIG. 6 is a side sectional view of the base plate of FIG. 5.

FIG. 6 is a side sectional view of the base plate 220 of FIG. 5.

It will be understood that the terms "generally," "approximately," "about," "substantially," as used within the specification and the claims herein allow for a certain amount of variation from any exact dimensions, measurements, and arrangements, and that those terms should be understood within the context of the description and operation of the invention as disclosed herein. Furthermore, the terms "round, "circular," and "diameter" do not require completely and perfect roundness, as a certain amount of deviation from complete roundness is allowed while a person of ordinary skill in the art would still recognize the shape as being "round," "circular," and/or having a "diameter."

Although the present invention has thus been described in detail with regard to the preferred embodiments and drawings thereof, it should be apparent to those skilled in the art that various adaptations and modifications of the present invention may be accomplished without departing from the spirit and the scope of the invention. For example, the swage hub inner and outer walls need not be perfectly round; rather, they could be elliptical, or could have some other non-round shape or even an asymmetric shape. If the swage hub inner and/or outer walls are elliptical, then the geometric center of the circle or ellipse that is defined by the swage hub inner wall would be offset from the geometric center of the circle or ellipse that is defined by the swage hub outer wall. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A disk drive suspension, the suspension having:

a distal end and a proximal end opposite the distal end;

a head slider mounted at the distal end for writing data to, and reading data from, a recording medium; and a swage hub near the proximal end for swaging the suspension to an actuator arm, the swage hub having a circular inner peripheral wall defining an inside diameter, and a circular outer peripheral wall defining an outside diameter;

wherein the inside diameter is offset from the outside diameter.

2. The suspension of claim 1 wherein the offset is in a proximal direction, such that a center of the inside diameter is farther away from the head slider than is the center of the outside diameter.

3. The suspension of claim 1 wherein the offset is in a distal direction, such that a center of the inside diameter is closer to the head slider than is the center of the outside diameter.

4. The suspension of claim 1 wherein the offset is within a range of 1% to 6% of the inside diameter.

5. The suspension of claim 1 wherein the offset is within a range of 2% to 4% of the inside diameter.

6. The suspension of claim 1 wherein the offset is within a range of 1% to 6% of the outside diameter.

7. The suspension of claim 1 wherein the offset is within a range of 2% to 4% of the outside diameter.

8. A disk drive suspension, the suspension having:

a proximal end and a distal end opposite the proximal end;

a base at the proximal end of the suspension, the base having a swage hub for swaging the base to an actuator arm, the swage hub having a circular inner wall and a circular outer wall;

a read/write head mounted at the distal end of the suspension;

a thickness of the swage hub defined by a distance between the swage hub inner wall and the swage hub outer wall;

wherein the thickness of the swage hub is non-uniform, the thickness varying from a minimum at a first position on the swage hub to a maximum at a second and diametrically opposite position on the swage hub.

9. The suspension of claim 8 wherein the swage hub minimum thickness is located at a proximal-most position on the swage hub, and the swage hub maximum thickness is located at a distal-most position on the swage hub.

10. The suspension of claim 8 wherein:

the swage hub inner wall defines a circle having a geometric center thereof;

the swage hub outer wall defines a circle having a geometric center thereof; and the swage hub inner wall geometric center is offset along a longitudinal axis of the suspension from the swage hub outer wall geometric center.

11. The suspension of claim 10 wherein the swage hub inner wall geometric center is offset in a proximal direction from the swage hub outer wall geometric center.

12. The suspension of claim 10 wherein:

the base is swaged to the actuator arm via the swage hub;

the base has a distal end and a proximal end; and post-swaging the proximal end of the base is deformed a greater amount than the distal end of the base.

13. The suspension of claim 10 wherein the swage hub inner wall geometric center is offset in a distal direction from the swage hub outer wall geometric center.

14. The suspension of claim 8 wherein:

the swage hub inner wall defines an ellipse having a geometric center thereof;

the swage hub outer wall defines an ellipse having a geometric center thereof; and the swage hub inner wall geometric center is offset along a longitudinal axis of the suspension from the swage hub outer wall geometric center.

15. A disk drive suspension, the suspension having:

a proximal end and a distal end;

a base at a proximal end of the suspension, the base having a swage hub for swaging the base to an actuator arm, the swage hub having a circular inner wall and a circular outer wall;

a read/write head at the distal end of the suspension; and a thickness of the swage hub defined by a distance between the swage hub inner wall and the swage hub outer wall, the thickness varying as a function of a position on a circumference of the swage hub;

wherein the swage hub is thinnest within a proximal-most 90° quadrant thereof.

16. The suspension of claim 15 wherein the swage hub is thickest within a distal-most 90° quadrant thereof.

17. The suspension of claim 16 wherein portions of the swage hub that lie between said proximal-most quadrant and said distal-most 90° quadrant have thicknesses that are greater than the thickness of the proximal-most 90° quadrant and less than the thickness of the distal-most 90° quadrant.

* * * * *